C. T. THORSSELL & H. L. R. LUNDÉN.
PROCESS FOR OXIDIZING AMMONIA, AMMONIUM COMBINATIONS, OR ORGANIC NITROGEN COMBINATIONS.
APPLICATION FILED APR. 10, 1918.
1,288,756.
Patented Dec. 24, 1918.
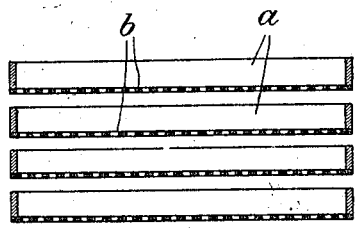
Inventors.
C. T. Thorssell and
H. L. R. Lundén
by,
Attorney.

UNITED STATES PATENT OFFICE.

CARL THEODOR THORSSELL AND HARALD LUDVIG REINHOLD LUNDÉN, OF GOTTENBORG, SWEDEN.

PROCESS FOR OXIDIZING AMMONIA, AMMONIUM COMBINATIONS, OR ORGANIC NITROGEN COMBINATIONS.

1,288,756.

Specification of Letters Patent. Patented Dec. 24, 1918.

Application filed April 10, 1918. Serial No. 227,797.

*To all whom it may concern:*

Be it known that we, CARL THEODOR THORSSELL, a citizen of Sweden, residing at Södra Hamngatan 11, Gottenborg, Sweden, and HARALD LUDVIG REINHOLD LUNDÉN, a citizen of Sweden, residing at Södra Hamngatan 11, Gottenborg, Sweden, have invented certain new and useful Improvements in Processes for Oxidizing Ammonia, Ammonium Combinations, or Organic Nitrogen Combinations, of which the following is a specification.

It is well known that bacteria are to be found in the earth which are able to transform ammonia or ammonium combinations or organic nitrogen combinations into nitrates preferably in the presence of an alkali or a material that forms basic bodies when reacting with water, such as magnesium oxid, dolomite, chalk, limestone, feldspar. The bacteria carry out this work that consists in an oxidation, by means of the oxygen of the air. Therefore it is evident that a necessary condition for this is to provide for an ample supply of air.

The solid body upon which the bacteria grow is called a substratum. The nitrificating or nitrate forming bacteria are to be found most abundantly in fertile garden soil, but this material is not fit for use in plants on a larger scale while, as mentioned above, a good supply of air must be provided and therefore it is necessary in using earth always to keep the same in a loose condition in order to freely admit the air. Thus the earth must be mellowed very often, and this would necessitate a working power too expensive for making the utilization of this biological process possible in an industrial respect. If, therefore, earth is not suitable as a substratum when working on a larger scale for industrial purposes, it is in all events appropriate as an inoculating material for the development of bacteria upon a suitable substratum.

A good substratum must have the following attributes.

1. It must be porous, fibered and not silty, muddy or jelly-like for providing a good circulation of air. It must not be silty when a liquid is washed through the same, as it then becomes impervious to air.

2. The substratum must possess a great capacity of absorption in such a way that the liquid to be treated may stay some time in the substratum before it runs off for the purpose of giving the bacteria time to carry out their work.

3. The substratum must contain as little as possible of such materials that can rot or ferment or in any other way be effected by organisms. Molds and protozoa are enemies of the nitrificating bacteria. But these bacteria eaters are in need of organic nutriment to live, such as cell-substance, straw, carbohydrates, organic acids and the like. On the contrary, the nitrificating bacteria live excellently in substrata having no traces of organic nutriment. Thus the substratum must not contain organic nutriment, and above all no such organic combinations that serve as nutriment for molds and denitrificating bacteria, *i. e.* bacteria forming free nitrogen out of nitrogen combinations. The best nutriment for such denitrificating bacteria are pentozana which abound in straw.

Therefore the substratum must consist of a solid, porous, fluffy material on which bacteria and carbonate of lime (a physiologically basic body) can fasten, and it must be able to absorb great quantities of liquid and to bring the ammonium salt in the liquid, the carbonate of lime, the oxygen of the air and the bacteria in a contact with each other as intimate as possible.

Thus it is evident that a material must be chosen as substratum that if possible possesses the following attributes; (1) It must allow a good circulation of the air, (2) it must be able in a high degree to absorb liquids, (3) it must be poor in organic nutriments, and (4) it must have a rough surface so that the bacteria and the carbonate of lime may fasten on it and not be washed away immediately by the flow of liquid.

Peat has long ago been proposed as substratum. But in the peat the nitrificating bacteria are not to be found, or at least very sparingly. Its fitness depends upon the degree in which it fills the above stated conditions. It is porous and has a great capacity of absorption, but it decomposes easily to slime whereby the admission of air is prevented, and it must be very carefully seen to that no moldered wood, grass or the like accompanies the peat. Toilet-sponge is an excellent material.

The present invention has for its object to make the oxidation as effective as possible by providing a substratum, that fills the conditions mentioned above as far as possible, in thin layers on shelves having a bottom of network or formed as a strainer. The substratum is mixed with a physiologically basic material, such as chalk, that can be well distributed in the substratum at the same time as the bacteria can be well spread and the air come into contact with every part of the layers. The shelves are preferably placed above each other. By intermittently letting the liquid to be treated on to the layers of substratum slime is washed downward to the lower layers which are cleaned more frequenly while the upper layers remain clean during a longer time. By intermittently letting on the liquid the alkaline material placed over the substratum will also be evenly distributed.

In the accompanying drawing a number of shelves $a$ are shown, said shelves being placed above each other and provided with perforated or net work bottoms $b$.

Having thus described our invention, what we claim as new and desire to secure by Letters Patent is:

1. The therein described process, which consists in supporting a relatively thin layer of substratum having an alkali incorporated therewith, said substratum being substantially free from all traces of organic nutriment, inoculating the substratum with a nitrificating bacteria, and passing a liquid containing an ammonium salt through the substratum in the presence of the air.

2. The herein described process, which consists in supporting a plurality of layers of substratum in spaced superposed relation, incorporating an alkali with the substratum, inoculating the substratum with a nitrificating bacteria, and passing a liquid containing an ammonium compound through the substratum in the presence of air by applying the liquid to the uppermost layer.

3. The herein described process, which consists in applying an alkali to a porous absorbent substratum being substantially free from all traces of organic nutriment, inoculating the substratum with a nitrificating bacteria, and supplying to the substratum a liquid containing an ammonium compound in the presence of air.

4. The herein described process, which consists in applying calcium carbonate to sponge, inoculating the mass with a nitrificating bacteria, and applying to the mass a liquid containing the compound to be oxidized, in the presence of the air.

5. The herein described process, which consists in supporting a plurality of layers of substratum in spaced superposed relation, incorporating calcium carbonate with the substratum, inoculated the substratum with a nitrificating bacteria, and passing a liquid containing an ammonium compound through the substratum in the presence of air by applying the liquid to the uppermost layer.

In testimony whereof, we have signed our names to this specification in the presence of two subscribing witnesses.

CARL THEODOR THORSSELL.
HARALD LUDVIG REINHOLD LUNDÉN

Witnesses:
ROBERT S. SAMUEL,
SYLVESTER E. ROTHCHILD, Jr.